Nov. 17, 1970 W. G. ANDERS 3,541,256

CABINET HOUSED TV TRANSMITTER AND RECEIVER CONSTRUCTION

Filed Oct. 16, 1967 4 Sheets-Sheet 1

INVENTOR.
Walter G. Anders
BY
Frease & Bishop
ATTORNEYS

INVENTOR.
Walter G. Anders
BY
Frease & Bishop
ATTORNEYS

CABINET HOUSED TV TRANSMITTER AND RECEIVER CONSTRUCTION

Filed Oct. 16, 1967 4 Sheets-Sheet 3

INVENTOR.
Walter G. Anders
BY
Frease & Bishop
ATTORNEYS

CABINET HOUSED TV TRANSMITTER AND RECEIVER CONSTRUCTION

Filed Oct. 16, 1967 4 Sheets-Sheet 4

INVENTOR.
Walter G. Anders
BY
Frease & Bishop
ATTORNEYS

United States Patent Office 3,541,256

Patented Nov. 17, 1970

3,541,256
CABINET HOUSED TV TRANSMITTER AND RECEIVER CONSTRUCTION

Walter G. Anders, Canton, Ohio, assignor to Diebold, Incorporated, Canton, Ohio, a corporation of Ohio Filed Oct. 16, 1967, Ser. No. 675,529
Int. Cl. A47b 81/06; H04n 5/64; H05k 5/00
U.S. Cl. 178—7.9 12 Claims

ABSTRACT OF THE DISCLOSURE

Cabinet housed portable TV camera and monitor construction of compact design, with a semi-concealed transparent shelf below a work counter on which a card or other document is supported and exposed to the lens of the camera adjustably housed below the shelf, with light reflection baffled lighting equipment below the shelf, and with the monitor mounted adjacent the work table in closed circuit television connection with the camera, the camera and monitor being removable plug-in units for ready replacement.

BACKGROUND OF THE INVENTION

Field of the invention

The invention relates to television equipment housed in cabinets and more particularly to a desk-like cabinet with television exposure, lighting and camera components housed in the cabinet used to take a picture of a card or document supported at a work station on a transparent shelf below the cabinet work counter, and used to transmit the picture by closed circuit television to a remotely located receiver or monitor as well as to a monitor mounted on the work counter, so that the individual at the work station taking and transmitting the picture of the exposed card may view the transmitted picture.

Such TV transmitters and receivers advantageously may be used in closed circuit television systems in conducting banking services and particularly may be used to supply a picture of a signature card to a bank teller for verifying at or near to the teller's station the signature of an individual presenting to the teller a check to be cashed.

Bank customer signature verification cards are located in files in the signature verification card department of a bank. The improved cabinet housed TV transmitter and receiver construction also will be located in such department so that a bank file clerk, when requested by a teller, may pull a card having a particular customer's signature thereon from the file and send a picture of the signature card to a TV receiver or monitor viewed by the teller at or near the teller's station. The teller then actually accomplishes the verification by comparing the signature on the check in hand with the signature on the transmitted customer's signature verification card picture displayed at the teller's TV monitor.

Description of the prior art

No compact cabinet housed TV transmitter and receiver equipment has been known or available in the art having a simple and inexpensive construction and using inexpensive portable plug-in cameras and receivers, by which a picture of a signature card of a bank account customer, or similar document, may quickly be taken adjacent the file for the cards by a bank file clerk with adequate lighting and without light reflection interference for transmission of the picture by closed circuit television to a plurality of monitors or receivers.

Heretofore necessary cameras and monitors, together with lighting and exposure equipment and TV circuitry components, and the arrangement thereof at a convenient work station, occupied considerable space and utilized complicated and expensive units, such that the use of television equipment for remote signature card verification by bank tellers has been impractical from an economic standpoint.

SUMMARY OF THE INVENTION

Objectives of the invention include providing a cabinet housed and mounted TV transmitter and receiver construction of compact design and arrangement which may be used as a desk or work station by a bank file clerk in the signature verification card department of a bank to take and transmit a television picture of a selected customer's signature card by closed circuit television to a monitor or receiver at a remote teller's station for viewing by a teller; providing portable, plug-in TV camera and receiver units and power supply and plug-in connections housed in the compact cabinet so that any such camera or receiver may be replaced quickly to correct defective operation; providing adjustable means for mounting the camera to achieve critical camera focus adjustment; providing reflection baffled lighting means below a transparent work support shelf within the cabinet for supporting, exposing and lighting a card or document whose picture is to be taken by the camera; and providing a construction achieving the stated objectives simply, effectively, compactly and inexpensively, and solving problems and satisfying existing needs for rapid transmission of signature card information for verification in conducting banking services.

These objectives and advantages are obtained by the equipment, the general nature of which may be stated as including in cabinet housed TV camera-transmitter and monitor-receiver construction, cabinet walls forming a cabinet chamber having a top work counter, transparent shelf means within the cabinet spaced below the work counter adapted to support documents to be photographed, access opening means for the shelf formed in one of the cabinet walls between the shelf and counter, TV camera means removably and adjustably mounted within the cabinet having lens means directed toward the undersurface of the transparent shelf, light-reflection inhibiting baffle means in the cabinet interposed between the camera and shelf; lighting means mounted within the cabinet adjacent the extremities of the transparent shelf, below the shelf and above the baffle means; power supply panel means within the cabinet; TV monitor means removably mounted within a separable monitor housing at the rear of the work counter; separable power and TV circuit connection means within the cabinet supplying power to the lighting means, camera and monitor and providing closed circuit television connection between the camera and monitor and adapted to be connected with other remotely located monitors; and a removable access panel for the cabinet permitting access to the components housed therein.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

Figures 1, 11:
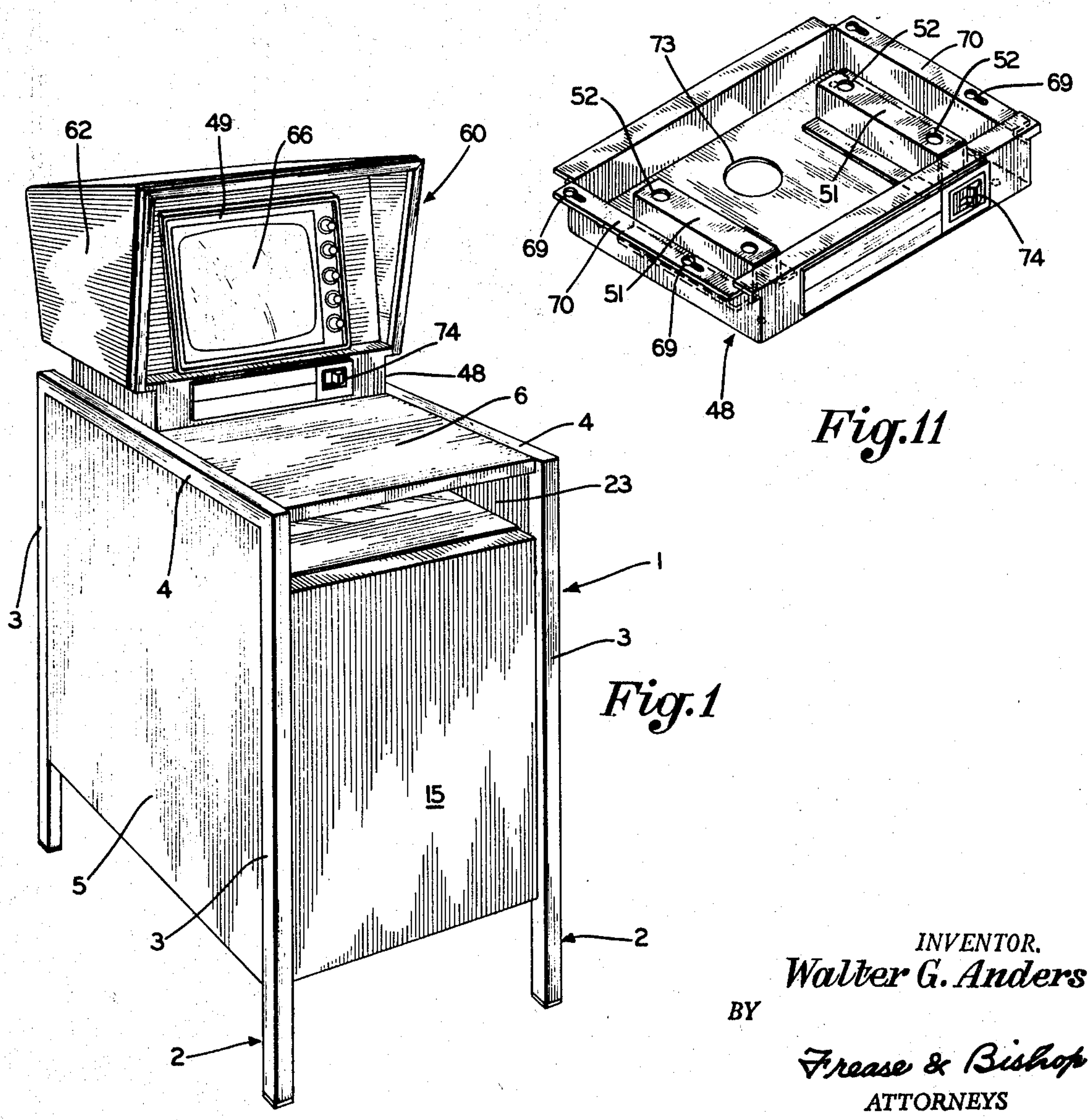
FIG. 1 of the drawings is a perspective view of the new cabinet housed TV transmitter and receiver construction.
FIG. 11 is a perspective view of the monitor base.

The improved cabinet housed TV transmitter and receiver construction is indicated generally at 1 in FIG. 1 and comprises side frame or leg assemblies formed as tubular U-shaped leg members 2 at each side, having upright portions 3 and a top cross member 4. Double walled side panels 5 are joined in any suitable manner to each leg member 2 between the upright portions 3 and below the cross member 4.

Figure 2:
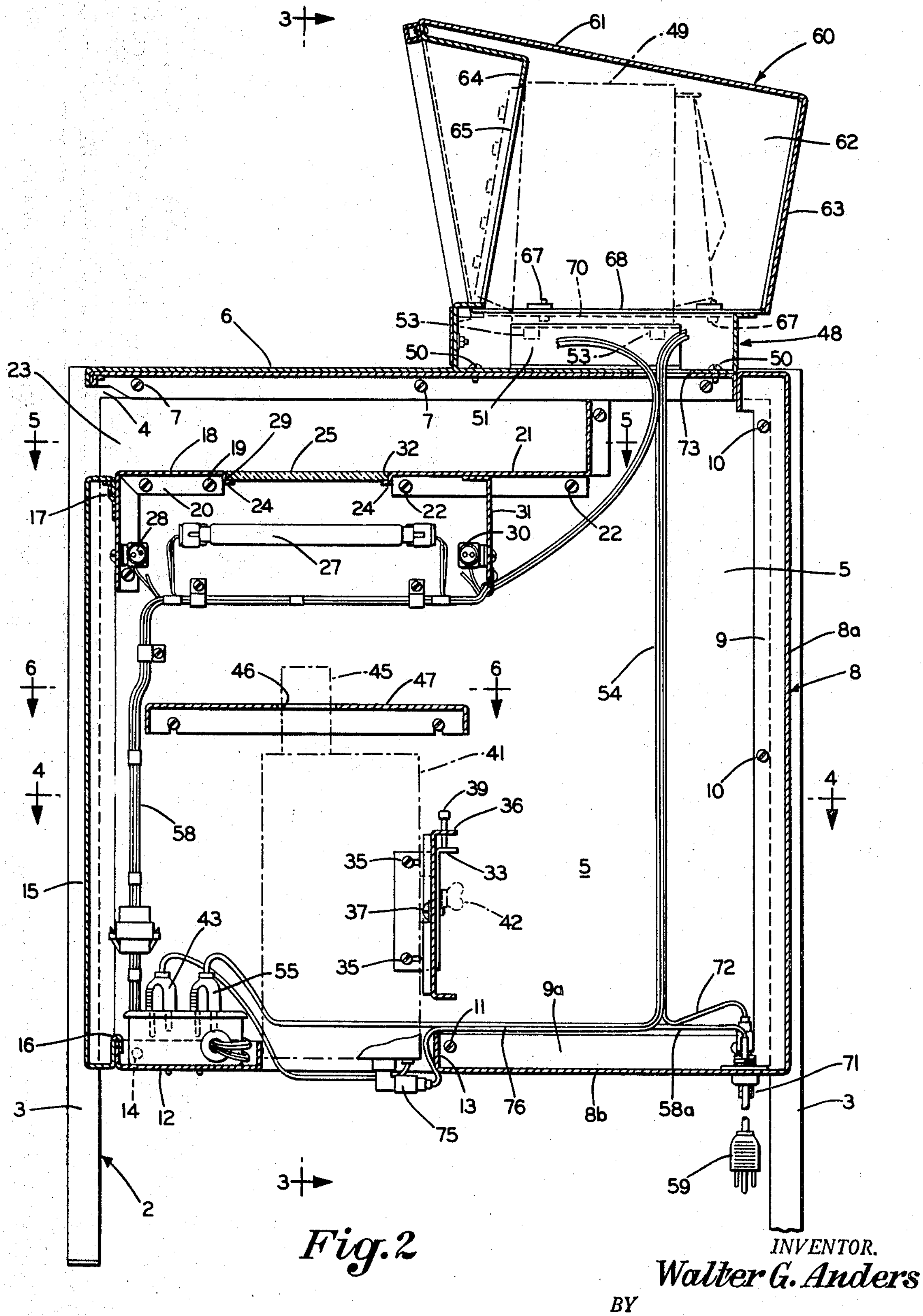
FIG. 2 is a side sectional view through the unit shown in FIG. 1.
Figures 4, 5, 6:
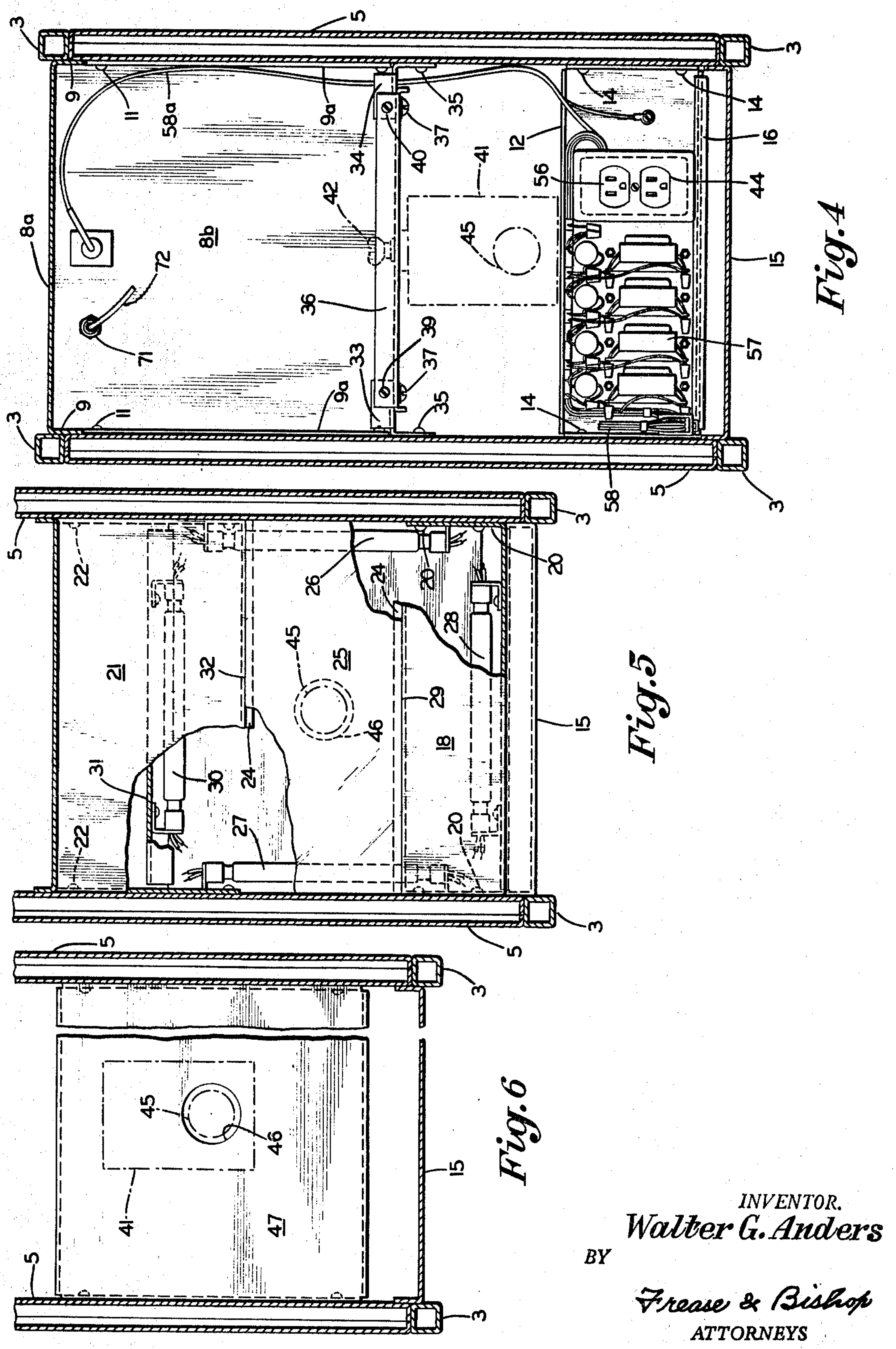
FIG. 4 is a plan sectional view taken on the line 4—4, FIG. 2.
FIG. 5 is another fragmentary plan sectional view taken on the line 5—5, FIG. 2.
FIG. 6 is another fragmentary plan sectional view with parts broken away taken on the line 6—6, FIG. 2.

A top member or work table counter 6 is bolted at 7 to the spaced top cross members 4 of the leg members 2. An L-shaped back and base member 8 having back portion **8*a* and base portion 8*b* has side flanges 9 and bottom flanges 9*a* bolted respectively at 10 and 11 to the rear upright portions 3 of the leg members 2 and to the lower rear portions of the side panels 5. A channel-shaped stretcher member 12 (FIG. 2) spaced forwardly of the forward edge 13 of the base portion 8*b* of the L-shaped member 8, is connected at its ends by bolts 14 to the lower ends of the front portions of the side panels 5** (FIGS. 2 and 4).

A front cover or access panel member 15 (FIG. 2) is removably mounted at 16 and 17 at the front of the unit 1 between the front upright portions 3 of leg members 2. The top mount 17 for the front panel 15 preferably is formed on an L-shaped front support bracket 18 bolted at 19 to side panels 5 by bolts extending through end flanges 20 at each end of the bracket 18. An L-shaped rear support bracket 21 is similarly bolted at 22 to the side panels 5. Support brackets 18 and 21 form a semiconcealed shelf below the work table 6, accessible through an opening 23 at the front and adjacent the top of the unit 1.

Support brackets 18 and 21 preferably are provided with flanges 24 on which a plate 25 of glass or other similar transparent material is supported extending between the support brackets 18 and 21 from front to rear and extending between the side panels 5. Thus, the plate 25 completes the shelf below the work table 6.

Side lighting fixtures 26 and 27 are mounted on the side panels 5 adjacent and below the side ends of the transparent plate 25. A front lighting fixture 28 is mounted on front support bracket 18 below and to the front of front edge 29 of the transparent plate 25. A rear lighting fixture 30 is mounted on a depending bracket 31 extending from rear support bracket 21 so that the lighting fixture 30 is below and to the rear of the rear edge 32 of the transparent plate 25.

The plate member 25 and brackets 18 and 21 thus form a semiconcealed transparent shelf below the work counter 6 on which a card or other document may be supported and illuminated from below by the lighting fixtures 26, 27, 28 and 30.

Figure 3:
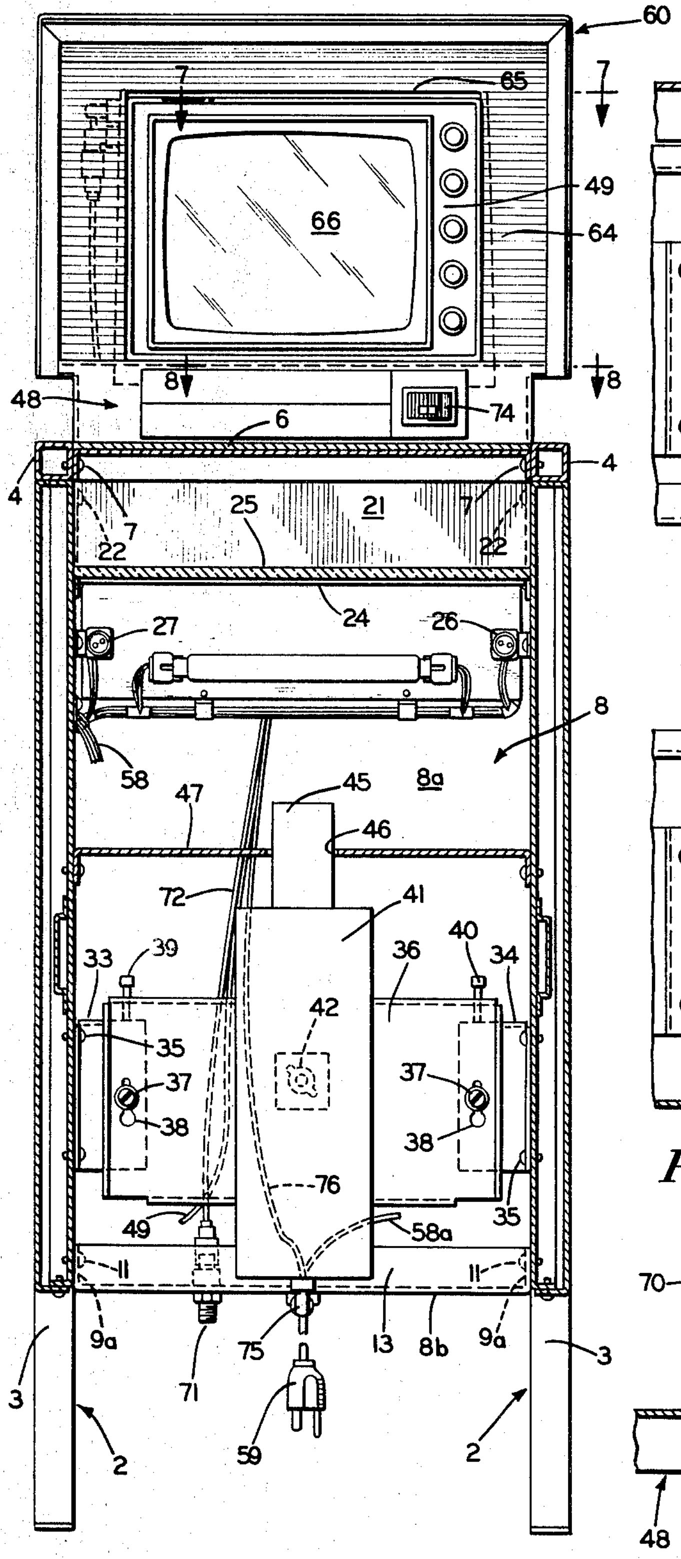
FIG. 3 is an end sectional view looking in the direction of the arrows 3—3, FIG. 2.

A pair of spaced fixed mounting brackets 33 and 34 are supported on the side panels 5 by bolts 35. An adjustable channel-shaped mounting bracket 36 extends between the fixed brackets 33 and 34 (FIG. 3) and is adjustably supported on the brackets 33 and 34 by bolts 37 extending through slots 38 in the member 36. Adjustable bracket 36 may be adjusted for height and also for tilting by screws 39 and 40.

A simple standard portable TV camera unit 41 may be mounted by usual thumb screw means 42 on adjustable bracket 36. Camera 41 may have a plug-in connection by plug 43 (FIG. 2) with power supply socket 44 (FIG. 4) mounted in stretcher member 12. Thus, when camera repairs are required, camera 41 may be unplugged and replaced by another camera simply by separating the thumb screw connection 42.

The lens 45 of camera 41 projects upwardly toward transparent plate 25 and extends through a hole 46 formed in a light shield baffle plate 47. Light shield 47 extends between and is mounted on the side panels 5, as shown. The upper surface of light shield 47 as well as the inside surfaces of panels 5 and the surfaces of support brackets 18 and 21 preferably are painted with black paint to eliminate light reflection within the cabinet and against plate 25. Baffle member 47 thus prevents light from the lighting fixtures which illuminates the camera housing and other elements in the lower part of the cabinet from reflecting upward toward the undersurface of transparent panel 25 and which otherwise would spoil the picture of any object lying thereon and photographed by camera 41.

Since the camera lens 45 is very close to the transparent shelf card support 25, on which a card, document or other object to be photographed is placed, focus is very critical. Accordingly, short range adjustment for mounting and leveling the camera with respect to support plate 25 must be made. This may be accomplished readily by adjustment of screws 39 and 40.

A base member generally indicated at 48 for a TV monitor 49 (FIG. 11) is bolted at 50 to cabinet top member 6 at the rear of the work table counter space thereon. Base 48 is provided with spaced inverted channel members 51, each of which is provided with a pair of spaced apertures 52 adapted to receive the feet 53 of TV monitor 49 for locating the monitor. The TV monitor 49 may be a portable unit of standard design and construction and may have a plug-in power connection through power line 54 and plug 55 which may be plugged into power supply socket 56 on the power panel. Thus, where repairs are required for TV monitor 49, the unit may be unplugged, removed and replaced by another monitor unit.

Transformers and starters generally indicated at 57 also may be mounted on power panel stretcher member 12 (FIG. 4) and connected through lines 58 to the various lighting fixtures 26, 27, 28 and 30 (FIG. 2). Power sockets 44 and 56 and the transformers and starters 57 may be supplied with power from any suitable source through a line **58*a* (FIG. 4) and external plug 59**.

Figure 13:
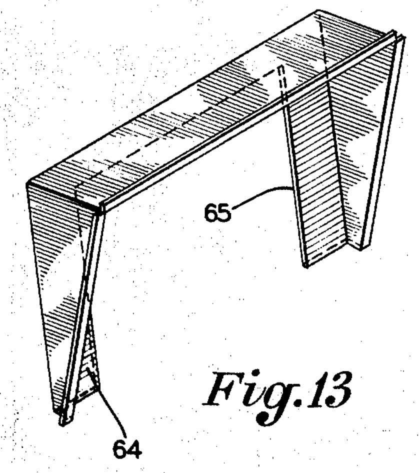
FIG. 13 is a perspective view of the front panel component of the monitor housing.
Figure 12:
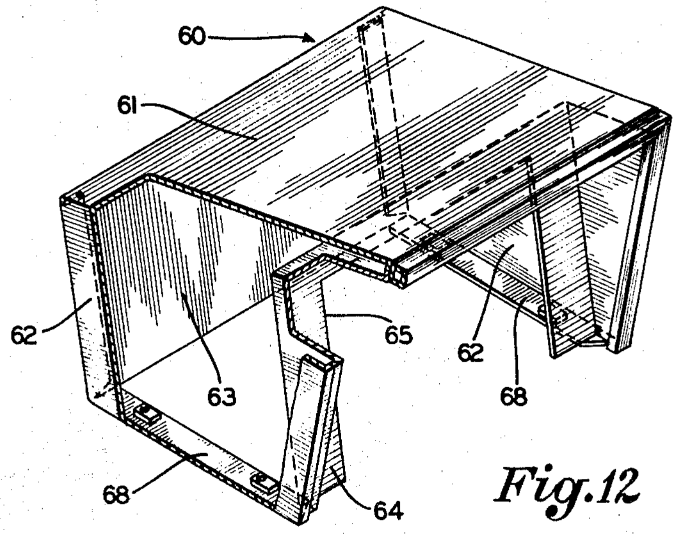
FIG. 12 is a perspective view with parts broken away of the monitor housing.

A TV monitor 49 when placed on monitor base 48 may be enclosed by a removable monitor housing generally indicated at 60 in FIG. 12. Monitor housing 60 has a top wall 61, side walls 62, rear wall 63 and an offset slanted front panel wall 64 formed with a rectangular opening 65 adapted to surround the picture tube 66 of the monitor 49. Front panel component 64 of monitor housing 60 may be formed of sheet metal and assembled in any suitable manner with the remaining sheet metal walls of the monitor housing 60, the subassembly panel component 64 being illustrated in FIG. 13.

Figure 7:
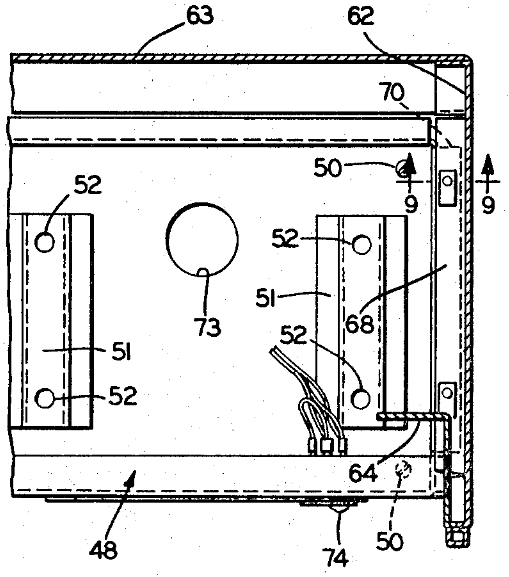
FIG. 7 is a fragmentary plan sectional view taken on the line 7—7, FIG. 3.
Figures 8, 9, 10:
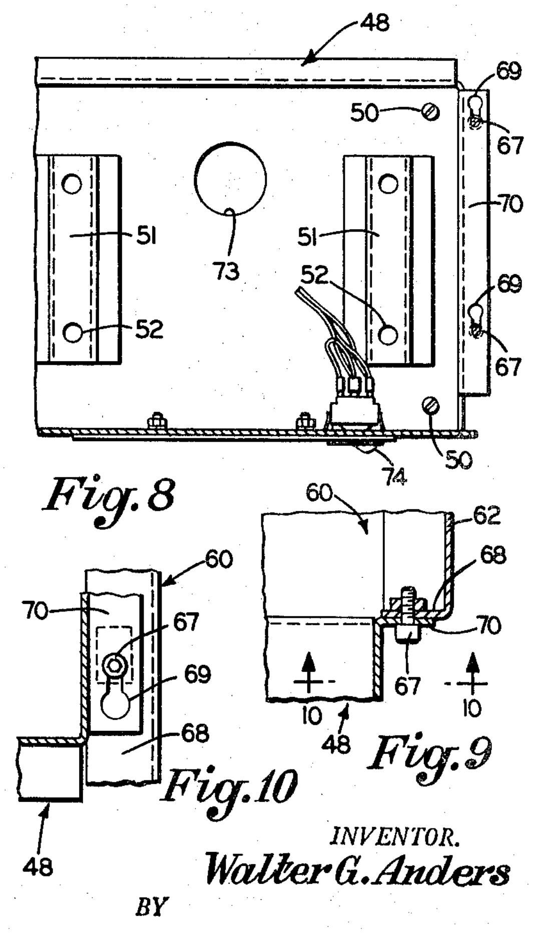
FIG. 8 is a view similar to FIG. 7 taken on the line 8—8, FIG. 3.
FIG. 9 is a fragmentary sectional view looking in the direction of the arrows 9—9, FIG. 7.
FIG. 10 is a fragmentary sectional view looking in the direction of the arrows 10—10, FIG. 9.

Housing 60 may have screws 67 (FIGS. 7, 9 and 10) adjustably carried by lower housing flanges 68, and the screws 67 may be releasably received in keyhole slots 69 formed in side flanges 70 of monitor base 48. In this manner monitor housing 60 may be assembled to monitor base 48 when a TV monitor 49 is located on base 48 with housing 60 enclosing the monitor 49. Screws 67 may be loosened and the housing moved rearwardly (FIG. 1) to disengage screws 67 from keyhole slots 69. Replacement of a TV monitor 49 thus readily may be made.

A closed circuit TV cable also may be connected with monitor 49 and may extend through the cabinet to an external cable connection 71. The cable, indicated at 72, as well as the power supply line 54 for monitor 49 may pass through opening 73 formed in monitor base 48. A switch 74 preferably is mounted in monitor base 48 for control of the lighting fixtures 26, 27, 28 and 30, and for energizing TV camera 41 and TV monitor 49. The front panel 64 of monitor housing 60 preferably is slanted upwardly rearwardly as best shown in FIG. 2 to conform to the slant of the picture tube 66 of TV monitor 49.

The TV camera 41 may have closed circuit TV cable connection through cable connector 75, and cable 76 with the TV monitor cable 72. The TV equipment also may have closed circuit TV cable connection with one or more other TV monitors at remote locations (not shown) such as at one or more teller's stations. The same TV picture will be displayed at the remote stations as is displayed on the picture tube 66 of monitor 49.

OPERATION AND USE OF CABINET HOUSED TV TRANSMITTER AND RECEIVER EQUIPMENT

One of the units 1 may be located in the signature verification card department of a bank adjacent the filing equipment for the verification cards. If a bank teller at a remote teller's station wishes to verify a signature on a check, presented by a customer, the teller communicates with a file clerk in the verification card department who locates the signature card for the particular customer. This signature card may be in a file tray which the clerk may remove from the filing equipment and place on the work table counter 6.

The signature card is removed from the file and the clerk reaches through the opening 23 and places the card face down upon the glass plate or window 25 of the partially concealed shelf. Meanwhile, switch 74 has been turned on to light the lights beneath plate 25 which illuminates the card. Camera 41 when energized takes a television picture of the card. The picture is transmitted both to the monitor 49 and to any other similar monitors at remote teller's stations where a teller may verify the signature on the customer's check by comparison with the signature displayed on the teller's monitor from the customer's signature card.

Normally, camera 41 is properly adjusted and focused for taking a clear picture of a card or other document placed on the glass plate 25 and illuminated by proper lighting. If the camera 41 needs adjustment, such adjustments may be accomplished by adjusting screws 39 and 40.

If the camera 41 or the monitor 49 require servicing, adjustment or repairs, either unit may be quickly removed and replaced by another unit. Access to the lighting fixtures, camera, power supply, etc. within the cabinet, may be gained by lifting and removing front access panel 15.

The relative location and arrangement of the lighting fixtures, the baffle plate 47, the camera and the semi-concealed transparent plate shelf window portion 25 permits adequate lighting of the area to be photographed without interfering reflection and without the lighting disturbing clerks in immediate vicinity, or without interfering with viewing the picture displayed at the monitor. At the same time the illuminated transparent shelf 25 on which the card or other document is photographed is readily accessible through the opening 23 in the cabinet immediately below the work counter 6. Thus, the clerk or operator from one position may perform all operations necessary and at the same time view the signature card being photographed by looking at the monitor picture tube 66.

The improved equipment is very compact in construction, is easy to use, and is very inexpensive since it incorporates standard, simple portable TV camera and receiver components without requiring complicated circuitry and controls. The improved construction, accordingly, provides effective and inexpensive equipment for rapid signature verification in conducting banking services, and eliminates difficulties heretofore present, and achieves the objectives and solves problems existing in the art in a simple and inexpensive manner.

In the foregoing description certain terms have been used for brevity, clearness and understanding; but no unnecessary limitations are to be implied therefrom beyond the requirements of the prior art because such terms are used for descriptive purposes and are to be broadly construed.

Moreover, the description and illustration of the invention is by way of example, and the scope of the invention is not limited to the exact details, or to the particular make or type of components shown or described.

Having now described the features, discoveries and principles of the invention, the manner in which the improved construction is made, assembled and used, the characteristics of the new construction, and the advantageous, new and useful structures, devices, elements, arrangements, parts and combinations, and mechanical equivalents obvious to those skilled in the art are set forth in the appended claims.

I claim:

1. Cabinet housed television camera and monitor construction including cabinet walls forming a cabinet chamber, one of the walls forming a top work counter; shelf means including transparent window means within the cabinet spaced below the work counter adapted to support an object to be televised; access opening means for shelf means formed in one of the cabinet walls between the shelf means and counter; television camera means removably and adjustably mounted within the cabinet having lens means directed upwardly toward the undersurface of the shelf means; light-reflection-inhibiting baffle means in the cabinet around the lens means and interposed between the camera and shelf means; and object lighting means mounted within the cabinet below the shelf means and above the baffle means for illuminating an object supported on the shelf window means.

2. The construction defined in claim 1 in which the baffle means is formed with an aperture, in which the camera means has tubular lens means projecting upwardly within the cabinet, and in which the lens means extends through the baffle means aperture.

3. The construction defined in claim 1 in which power supply means for the camera means and lighting means is mounted in the cabinet, in which the camera means has a power line releasably connected with the power supply means, in which closed circuit television cable means is mounted in the cabinet, and in which the camera means has a cable releasably connected with the television cable means, whereby the camera may be bodily replaced by releasing the power supply means and cable means connections.

4. The construction defined in claim 1 in which separable monitor housing means is mounted on the cabinet at the rear of the work counter, in which a television monitor is removably mounted within the monitor housing means, and in which the monitor has a cable releasably connected with the television cable means.

5. The construction defined in claim 4 in which the monitor housing means includes a housing base mounted on the cabinet having monitor locator means formed thereon, in which a monitor is releasably supported on the locator means, and in which the monitor housing means also includes a housing member removably and releasably connected with the housing base enclosing the monitor.

6. Cabinet housed television camera and monitor construction including cabinet walls forming a cabinet chamber, one of the walls forming a top work counter; shelf means including transparent window means within the cabinet spaced below the work counter adapted to support an object to be televised; access opening means for the shelf means formed in one of the cabinet walls between the shelf means and counter; television camera means removably and adjustably mounted within the cabinet having lens means directed upwardly toward the undersurface of the shelf means; light-reflection-inhibiting baffle means in the cabinet around the lens means and interposed between the camera and shelf means; and object lighting means mounted within the cabinet below the shelf means and above the baffle means for illuminating an object supported on the shelf window means; in which the cabinet has spaced side walls; in which the shelf means comprises a front support bracket extending between the side walls within the cabinet spaced below the work counter, and a rear support bracket extending between the side walls within the cabinet spaced below the work counter and spaced rearwardly of said front bracket; and in which the transparent window means is supported on and between said front and rear support brackets and extends between the cabinet side walls.

7. The construction defined in claim 6 in which the lighting means includes a lighting fixture mounted within the cabinet on each side wall below the window means, a lighting fixture mounted within the cabinet on the front support bracket below the window means, and a lighting fixture mounted within the cabinet on the rear support bracket below the window means.

8. The construction defined in claim 6 in which the baffle means is formed with an aperture, in which the camera means has tubular lens means projecting upwardly within the cabinet, and in which the lens means extends through the baffle means aperture.

9. The construction defined in claim 6 in which power supply means for the camera means and lighting means is mounted in the cabinet, in which the camera means has a power line releasably connected with the power supply means, in which closed circuit television cable means is mounted in the cabinet, and in which the camera means has a cable releasably connected with the television cable means, whereby the camera may be bodily replaced by releasing the power supply means and cable means connections.

10. The construction defined in claim 6 in which separable monitor housing means is mounted on the cabinet at the rear of the work counter, in which a television monitor is removably mounted within the monitor housing means, and in which the monitor has a cable releasably connected with the television cable means.

11. The construction defined in claim 10 in which the monitor housing means includes a housing base mounted on the cabinet having monitor locator means formed thereon, in which a monitor is releasably supported on the locator means, and in which the monitor housing means also includes a housing member removably and releasably connected with the housing base enclosing the monitor.

12. Cabinet housed television camera and monitor construction including cabinet walls forming a cabinet chamber, one of the walls forming a top work counter; shelf means including transparent window means within the cabinet spaced below the work counter adapted to support an object to be televised; access opening means for the shelf means formed in one of the cabinet walls between the shelf means and counter; television camera means removably and adjustably mounted within the cabinet having lens means directed upwardly toward the undersurface of the shelf means; light-reflection-inhibiting baffle means in the cabinet around the lens means and interposed between the camera and shelf means; and object lighting means mounted within the cabinet below the shelf means and above the baffle means for illuminating an object supported on the shelf window means; in which the cabinet has spaced side walls, in which fixed brackets are mounted on the cabinet side walls within the cabinet, in which a movable bracket is adjustably mounted on and extending between the fixed brackets, in which the camera means is removably mounted on the movable bracket, and in which adjusting means is interposed between the fixed and movable brackets for tilting the camera means and for moving the camera toward and away from the shelf window means.

References Cited

UNITED STATES PATENTS

| | | | |
|---|---|---|---|
| 2,806,754 | 9/1957 | Abeles | 178—7.9 |
| 2,986,596 | 5/1961 | Hammond | 178—6.8 |
| 3,047,654 | 7/1962 | Cornberg | 178—6.8 |

RICHARD MURRAY, Primary Examiner

H. W. BRITTON, Assistant Examiner

U.S. Cl. X.R.

312—7, 196